United States Patent [19]
Cances et al.

[11] Patent Number: 5,519,404
[45] Date of Patent: May 21, 1996

[54] METHOD OF ALLOCATING A COMMUNICATION CHANNEL IN A SATELLITE NETWORK

[75] Inventors: Jean-Pierre Cances, Toulouse; Gérard Maral, Goyrans; Bernard Coulomb, L'Union; Régis Lenormand, Blagnac, all of France

[73] Assignee: France Telecom, Paris, France

[21] Appl. No.: 348,178

[22] Filed: Nov. 28, 1994

[30] Foreign Application Priority Data

Dec. 14, 1993 [FR] France .................................. 93 15001

[51] Int. Cl.$^6$ .................................................. H04B 7/185
[52] U.S. Cl. ........................... 342/354; 342/352; 455/12.1
[58] Field of Search ............................ 342/352, 354; 455/12.1, 13.1, 13.4

[56] References Cited

U.S. PATENT DOCUMENTS

5,268,694  12/1993  Jan et al. ............................ 342/354
5,355,138  10/1994  Cances et al. .

Primary Examiner—Thomas H. Tarcza
Assistant Examiner—Dao L. Phan
Attorney, Agent, or Firm—Laubscher & Laubscher

[57] ABSTRACT

The invention concerns a method of allocating a respective free radio beam channel to calling and called stations of a satellite telecommunication network. If there is no free channel on a beam forming the coverage including one given station, the method of the invention looks for free channels in each beam adjacent said beam, and allocates one of the adjacent beam free channels to the given station as soon as in an optimal subset of beams comprising all beams using the same channel as the free channel each level of isolation equal to the ratio of an antenna gain of a main lobe of a respective one of the beams of the optimal subset to the sum of the maximal antenna gains of secondary lobes of the other beams is greater than a given threshold.

5 Claims, 4 Drawing Sheets

FIG. 3
DETERMINATION OF OPTIMAL SUBSETS

FIG.4
CAPACITY REALLOCATION

FIG. 5
COVERAGE RECONFIGURATION

METHOD OF ALLOCATING A COMMUNICATION CHANNEL IN A SATELLITE NETWORK

BACKGROUND OF THE INVENTION

1. Field of the Invention

The present invention relates generally to telecommunications between earth transmitting-receiving stations via a satellite.

2. Description of the Prior Art

Figure 1:
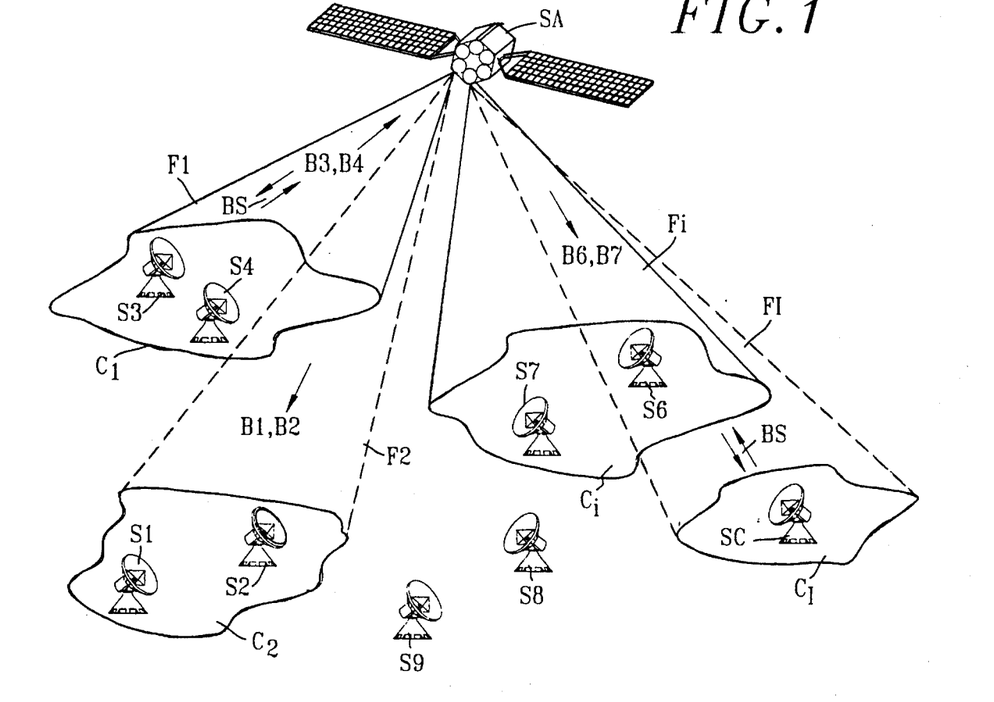
FIG. 1, already commented on, shows a satellite network installation including a satellite and a plurality of earth stations.

More exactly, the invention relates to a method of allocating communication channels to calling stations and called stations in a satellite telecommunications network employing frequency re-use in response to a call setting-up request transmitted by the calling station to a control station SC. As shown in FIG. 1, a satellite telecommunication network is typically defined by a plurality N=9 of earth transmitting-receiving stations S1 through S9, the control station SC and a satellite SA. Setting up a call between a calling station, such as the station S3, and a called station, such as the station S6, of the plurality of stations entails allocating a channel or frequency band B3 to the calling station S3 and a channel B6 to the called station S6, each of the channels B3 and B6 belonging to a given beam. The data to be transmitted produced by the station S3 is transmitted to the satellite SA on the uplink channel B3 and retransmitted from the satellite SA to the called station S6 on the downlink channel B6.

A call setting-up phase is started at the initiative of the calling station S3 which produces a call setting-up request message intended for the control station SC via the satellite SA. This call setting-up request message is sent on an uplink signalling channel BS from the calling station to the satellite and retransmitted on a downlink signalling channel BS from the satellite to the control station SC. The control station SC retransmits a call setting-up message to the calling station S3 as soon as two channels, the channels B3 and B6 in this example, can be respectively allocated to the stations S3 and S6.

The prior art provides two methods of managing radio beam coverage in a satellite network in the context of a low-power satellite SA.

In a first method, the network having a predetermined number of channels, a variable number of channels are allocated to each beam according to the level of traffic. To this end dynamic reallocation of channels of the payload of the satellite SA between the radio beams is effected, depending on the traffic demand on those beams. In a method of this kind the beams are fixed, which means that the coverage of each beam for each of the channels constituting it has a constant extent defined by an antenna gain at less equal to a minimal gain. On the other hand, for a given beam, the number of channels varies in time. Reducing by one the number of channels in one beam entails increasing by one the number of channels in another beam. A satellite implementing this method is called a capacity reallocation matrix satellite.

A second method is described in U.S. Pat. No. 5,355,138 issued on Oct. 11, 1994, the contents of which are hereby incorporated by way of reference into this description. A satellite network is managed by coverage reconfiguration. In this second method, unlike the first method previously mentioned, the number of channels in each radio beam is fixed and the coverage of each beam is modified in time by reducing or increasing the coverage area in accordance with call setting-up requests produced in the network. In practise, although the number of channels in each beam is constant, there is provision for exchanging channels between beams. Allocating a channel of a first beam to a second beam entails allocation to the first beam of a channel of the second beam. Accordingly, the "bandwidth" of the set of channels of a beam remains constant. The size of the beam coverage is reconFig.d in the following manner.

To set up a call, i.e. a link, between a calling station and a called station of the network via the satellite SA, the calling station first sends a call setting-up request message to the control station SC via a signalling channel BS of the satellite SA. The development in the configuration of the network relative to the calling and called stations is simulated in the control station. A call setting-up authorization message is transmitted by the control station SC to the calling station when simulated authorizations have been derived by the control station SC for both the calling and called stations. Each of these simulated authorizations corresponds to the possible allocation of a respective free channel for the calling station and the called station.

Two main scenarios are provided for each station in the simulation in the control station. Each of these two scenarios is directly related to the limited power of the satellite SA.

In the first scenario (FIG. 5 of U.S. Pat. No. 5,355,138) relating to the situation in which the calling or called station does not belong to any radio beam coverage, the coverage nearest the station is selected first. The beam coverages other than the selected coverage are then reduced in size to free up a fraction of the power output by the satellite SA in these other beams. This freed up portion of the power is then used to increase the surface (footprint) of the selected coverage in order to include the station in it. A simulated authorization is derived in the control station as soon as the station can be included in the selected coverage by increasing its surface and a channel is free in the selected beam coverage.

In the second scenario (FIG. 11 of U.S. Pat. No. 5,355,138), relating to the situation in which the calling or called station is included in a radio beam coverage, there are two sub-scenarios. Either the beam of this coverage has a free channel, in which case this free channel is allocated to the station; or there is no free channel in the beam associated with the coverage including the station, in which case the coverage nearest this coverage having a free channel is looked for. A load transfer is then effected between the nearest coverage having a free channel and the coverage including the station. This load transfer entails increasing the surface of the nearest coverage in order to include the station in it and commensurate reduction in the surface of the coverage including the station. A simulated authorization is derived for the station as soon as it can be included in the adjacent coverage and a channel is free in the adjacent coverage.

As soon as simulated authorizations have been derived in the control station SC for both the calling and called stations, the control station sends to the satellite SA power and phase-shift control values to modify the geometries of the coverages concerned, that is to say, also, those including the calling and called stations in accordance with the simulation carried out. A call setting-up authorization message is also sent via the satellite SA to the calling station in order that a communication phase between the calling and called stations can begin.

In a variant of the first scenario, relating to the situation in which the station is not included in any coverage, there is provision for selecting not only the nearest coverage but also the lowermost surface coverage in the network and for each of these two coverages to reduce the surfaces of the other coverages in order to include the station in the selected coverage, either the nearest one or the one with the lowermost surface. In this variant, two respective gains for the station are calculated by simulation in the control station SC according to whether the station is included in the nearest coverage or the lowermost surface coverage. The coverage to include the station S is chosen as that which offers the highest gain. The power and phase-shift control values for the radiating elements of the satellite antenna are thus transmitted by the control station SC to the satellite SA.

The first and second prior art methods described hereinabove ignore frequency re-use in the network and therefore the problem caused by management of channels corresponding to the same frequency band in different beams. For reasons relating to limitation of the frequency bandwidth available on the satellite, it can be beneficial to re-use the same channels or frequency bands in different beams.

Nevertheless, it seems that such re-use of the same band of frequencies in different beams causes interference dependent on the angular separation between the different beams.

OBJECT OF THE INVENTION

The invention is directed to providing a method for managing the allocation of a channel to a station which guarantees that channels of different radio beams corresponding to the same frequency band do not cause more than a specific maximum level of interference.

SUMMARY OF THE INVENTION

In a first variant, the invention concerns a satellite network using coverage reconfiguration.

Accordingly, in a satellite telecommunication network comprising a control station, a satellite for forming beams of radio channels under the control of the control station, and plural earth stations for transmitting beam channels to the satellite and receiving beam channels from the satellite, same channels being re-used in different beams, there is provided a first method for allocating a free beam channel by the control station to calling and called stations, in response to reception of a call setting-up request message emitted by the calling station via a signalling channel of the satellite in the control station.

The first method entails simulation in the control station of one of first and second alternatives separately for each of the calling and called stations, and then a final step.

(a) The first alternative whereby at least one free channel belongs to a beam forming a coverage including each of the calling and called stations, comprises the step of allocating the at least one free channel to each of the calling and called stations.

(b) The second alternative whereby there is no free channel on the beam forming the coverage including each of the calling and called stations, comprises the following iterative steps:

(b1) searching for free channels in each of adjacent beams from that nearest to that farthest from the beam forming the coverage including each of the calling and called stations thereby identifying free channels, and (b2) in response to the free channels identified in each of the adjacent beams, allocating in a simulated way one of the free channels identified in each of the adjacent beams to each of the calling and called stations by transferring load between the coverage including each of the calling and called stations and an adjacent coverage associated with each of the adjacent beams by reducing in surface the coverage including each of the calling and called stations and increasing in surface the adjacent coverage so that each of the calling and called stations is included in the adjacent coverage, and determining optimal subsets of beams each comprising beams able to re-use the same channel, and selecting the one of the free channels identified in each of the adjacent beams as that which is least used in one of the optimal subsets of beams including each of the adjacent beams.

(c) The final step comprises the step of emitting a call setting-up authorization message from the control station to the calling station as soon as the one of the free channels identified is allocated to each of the calling and called stations.

Preferably, the step of determining optimal subsets of beams includes the following iterative steps of:

constituting $$C_I^T = \frac{I!}{T!(I-T)!}$$

separate subsets of T beams from I beams of the network, T being an integer initialized to 2 and being incremented by 1 on each iterative step up to at most I, and for each of the $C_I^T$ subsets of T beams calculating T levels of isolation each equal to the ratio of an antenna gain of a main lobe of a respective one of the beams in each of the $C_I^T$ subsets of T beams to the sum of the respective maximal antenna gains of secondary lobes of the other beams in each of the $C_I^T$ subsets of T beams provided that a conditional relationship establishing that T levels of isolation calculated for at least one of the $C_I^T$ subsets of T beams are more than a predetermined threshold is satisfied.

The optimal subsets of beams is made up of subsets of beams from $C_I^{T_L-1}=(I!)/[(T_L-1)!(I-T_L+1)!]$ for each of which $[T_L-1]$ levels of isolation calculated are more than the predetermined threshold. $T_L$ denotes an integer value assumed by T for which the conditional relationship is not satisfied.

Advantageously, the first method can include in the simulation carried out in the control station, a third alternative whereby each of the calling and called stations is not included in any beam coverage. The third alternative comprises the steps of:

determining from beam coverages existing in the network a coverage nearest to each of the calling and called stations and a lowermost surface coverage;

by iteration, for each of the nearest and lowermost surface coverages, reducing in size each of the coverages other than each of the nearest and lowermost surface coverages whilst maintaining in the coverages stations which are active prior to the reception of the call setting-up request message, until each of the nearest and lowermost surface coverages can be increased to include each of the calling and called stations with a respective antenna gain in each of the nearest and lowermost surface coverages, and selecting one of the nearest and lowermost surface coverages into a selected coverage as a function of the higher of two antenna gains respectively calculated for the nearest and lowermost surface coverages to include each of the calling and called stations in the selected coverage, the step of selecting being followed by one of the first and second alternatives and the final step.

Furthermore, in order to uniformly distribute the busy radio channels into the beams of the network, the first method comprises, in response to a number of busy radio channels in one of the beams existing in the network greater than the integer part of a ratio of a number of busy radio channels in the network to the number of beams existing in the network, executing the second alternative for each station covered by the one of the beams, when the number of the busy radio channels in the one of the beams is greater than the integer part, so that to each of the stations belonging to a coverage of the one of the beams is assigned a radio channel of a beam adjacent one of the beams to free up a radio channel in the one of the beams.

In a second variant, the invention concerns a satellite network using capacity reallocation.

Accordingly, there is provided a second method for allocating a free beam channel by the control station to calling and called stations, in response to reception of a call setting-up request message emitted by the calling station via a signalling channel of the satellite in the control station. The second method entails also simulation in the control station of one of first and second alternatives separately for each of the calling and called stations, and then a final step. The first alternative, the first substep (b1) in the second alternative and the final step in the first and second methods are identical.

The second method differs from the first method by a second substep (b2) which consists in allocating to each of the calling and called stations of one of the free channels identified in each of the adjacent beams as soon as in an optimal subset of beams comprising all beams using the same channel as one of the free channels, each level of isolation equal to the ratio of an antenna gain of a main lobe of a respective beam from the all beams in the optimal subset to the sum of maximal antenna gains of secondary lobes of the other beams in the optimal subset is greater than a given threshold.

BRIEF DESCRIPTION OF THE DRAWINGS

Further features and advantages of the invention will be apparent more clearly from the following description of several embodiments of the invention with reference to the corresponding accompanying drawings in which.

DESCRIPTION OF THE PREFERRED EMBODIMENTS

Figure 2:
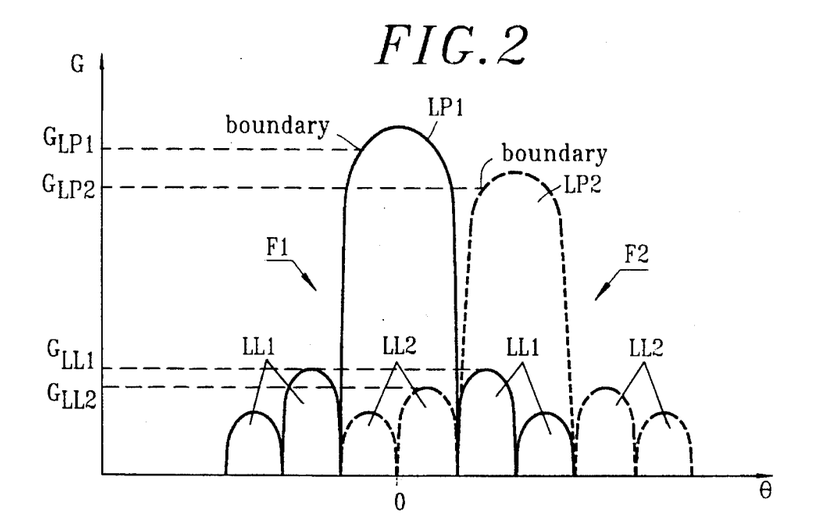
FIG. 2 shows two antenna radiation diagrams to illustrate the phenomenon of interference between channels of two beams.

In FIG. 2 are shown two antenna radiation diagrams, respectively in solid line and in dashed line. FIG. 2 is a plot of the gain G as a function of an angle θ. These two radiation diagrams are associated with respective radio beams F1 and F2 in the satellite network shown in FIG. 1 and are intended to show the cause of interference between channels corresponding to the same frequency band in different beams. Each of the two radiation diagrams has a respective main lobe LP1, LP2 and respective secondary lobes LL1, LL2 to the side of the main lobe. If two beams, here denoted F1 and F2, using two respective channels corresponding to the same frequency band are not sufficiently isolated spatially, channel interference occurs between the secondary lobes LL1, LL2 of one beam and the main lobe LP2, LP1 of the other beam, for the channel in question. Accordingly, data transmitted on the channel of one beam is disrupted by the data transmitted on the channel of the other beam. It is assumed in practise that the beams are sufficiently isolated spatially in pairs for only the secondary lobes of a beam to have to be taken into account in calculating the disturbance caused to the main lobe of another beam.

Of course, such interference affects not only the uplink channels for transmitting data from the earth stations to the satellite SA but also the downlink channels for transmitting data from the satellite SA to the earth stations. If two beams F1 and F2 are associated with two respective channels corresponding to the same frequency band, the uplink data received by the satellite on one of the two channels can be disturbed by data received on the other of the two channels, depending on the geographical locations of the two stations sending on the respective channels of the two beams F1 and F2. If two beams are associated with two respective channels corresponding to the same frequency band, the downlink data on one of the two channels received from the satellite SA by a station covered by one of the beams is disturbed by data transmitted by the satellite on the other of the two channels to a station covered by the other of the beams, depending on the geographical locations of the two stations.

As shown in FIG. 2, there are in practise two levels of isolation for two beams associated with respective channels corresponding to the same frequency band. To calculate each of these two levels of isolation, respectively representative of the minimal quality of the link on the two channels, independently of the location of the stations, each of the two channels associated with the two beams F1 and F2 is considered in turn as a disturbed channel and a disturbing channel. In FIG. 2, a first level of isolation relating to isolation of the channel of beam F2 relative to the channel of beam F1 is equal to the ratio of an antenna gain, called the minimal gain $G_{LP2}$, of the main lobe LP2 at the boundary of the coverage of the beam F2 to a maximum antenna gain $G_{LL1}$ of the secondary lobes LL1 of the beam F1. A second level of isolation relating to the isolation of the channel of beam F1 relative to the channel of beam F2 is equal to the ratio of an antenna gain, called the minimal antenna gain $G_{LP1}$, of the main lobe LP1 at the boundary of the coverage of the beam F1 to a maximal gain $G_{LL2}$ of the secondary lobes LL2 of the beam F2. More generally, in the case of N beams associated with N respective channels corresponding to the same frequency band, N levels of isolation are determined by calculating in turn the disturbance caused on one of the N channels of one of the beams by the (N−1) other channels of the other beams. Each of the N levels of isolation is equal to the ratio of the minimal antenna gain of the main lobe of one of the beams at the boundary of the beam concerned to the sum of the maximal antenna gains of the secondary lobes of the other beams.

The general algorithm for determining optimal subsets of beams based on the foregoing considerations is now described with reference to FIG. 3. Two variant implementations of this algorithm or steps of this algorithm for implementation of the invention are described subsequently with reference to FIGS. 4 and 5, respectively for a satellite network with fixed coverages using capacity reallocation and for a satellite network using coverage reconfiguration. The objective of an algorithm of this kind, used in simulation in the control station SC, is to determine optimum subsets of beams, i.e. to determine groups of beams which can each re-use channels corresponding to the same frequency band without generating interference between beams and each include a maximal number of beams. The algorithm determines these optimum subsets by an iteration.

It should be noted that in the following description the calculation of levels of isolation between beams is of the "symmetrical" type for the uplinks and downlinks. This means that two levels of isolation of a disturbed beam channel relative to a plurality of disturbing beam channels, of uplinks and downlinks, respectively, are equal. This "symmetrical" type simplifies the calculations to be carried in the control station.

In practise an accurate calculation of a level of isolation of a beam relative to another for two stations re-using two channels corresponding to the same frequency band would require a knowledge of the geographical location of the two stations respectively in the coverages of the two beams in order to deduce therefrom antenna gains. For simplicity, a minimal level of isolation is calculated as a function of the main lobe gain G for a first beam, at the boundary of that beam and a maximal secondary lobe gain G of a second beam or the sum of plural maximal secondary lobe gains G for plural second beams.

Figure 3:
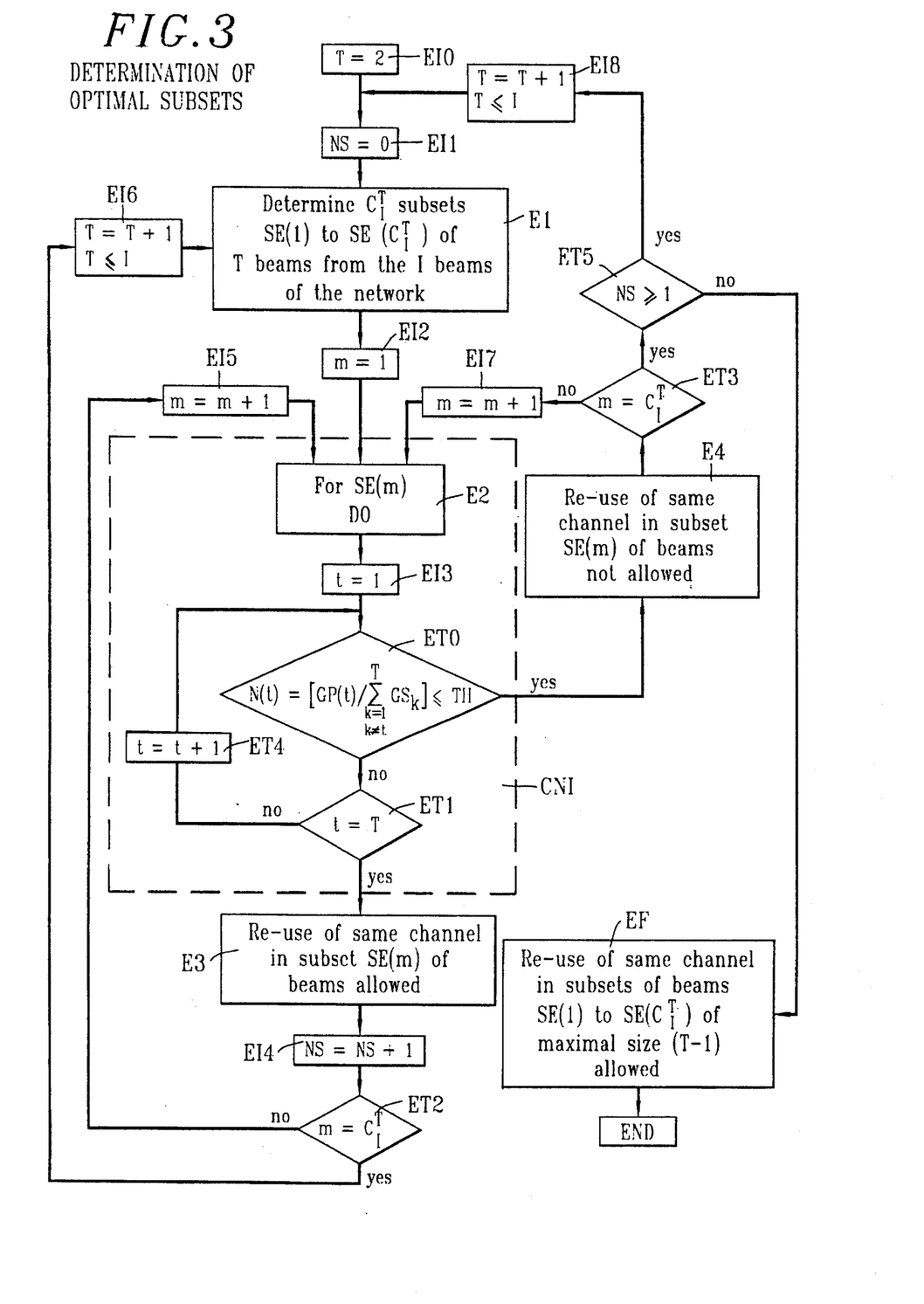
FIG. 3 is a general algorithm for determining optimum subsets of beams with tolerable interference.

As shown in the initialization step EI0 and the main step E1 of FIG. 3, the algorithm starts by determining all subsets of size T=2, i.e. of two beams, which can be formed from the I radio channel beams of the satellite network. Combinatorial logic teaches that $C_I^{T=2}$ subsets with two beams are determined with $$C_I^{T=2} = \frac{I!}{T!(I-T)!}.$$

M subsets determined in this way are denoted SE(1) through SE(M=$C_I^{T=2}$) in the algorithm.

For each of these subsets SE(m) with m between 1 and M=$C_I^{T=2}$, as shown by a step EI2 of initializing to 1 the index m and a step EI5 of incrementing by 1 this index m, a calculation CNI of T levels of isolation is effected. For each SE(m) of the subsets with T=2 beams, each of the T=2 levels of isolation N(1) and N(2) is compared to a threshold TH (step ET0). Each of the levels of isolation N(t), with $1 \le t \le T=2$, is equal to the ratio of the gain GP(t) of the main lobe of the respective one of the beams in the subset SE(m) at the boundary of the coverage of this beam to the sum of the respective maximal gains $$\left( \sum_{k=1}^{\Sigma} GS_k \right)$$

of the secondary lobes of the k other beams, with k≠t and k<T. For T=2 the aforementioned sum comprises only one gain value.

As indicated by the cyclic test steps ET0 and ET1 and the incrementing step ET4, if the T levels of isolation N(t) with $1 \le t \le T$ calculated for the subset SE(m) are greater than the threshold TH, then T=2 respective channels corresponding to the same frequency plan can be re-used in the two beams constituting the subset SE(m) (step E3). On the other hand, if at least one level of isolation N(t) is less than the threshold TH, then re-use of channels corresponding to the same frequency band in the beams of the subset SE(m) concerned is not allowed (step E4). As shown by the steps ET2 and EI5 at the exit from step E3 and by the steps ET3 and EI7 at the exit from step E4, a calculation CNI of two levels of isolation is effected for each of the $C_I^{T=2}$ subsets of T=2 beams of the network. The characteristics of the subsets which can re-use channels corresponding to the same frequency bands are memorized.

Another variable NS is initialized to zero at the start of the algorithm, in step EI1, and indicates the number of subsets of size T=2 that can use the same channel. This variable is incremented by one at the exit from step E3, in step E14.

After all the subsets of size T=2 have been processed to determine which ones of these subsets contain beams authorized to re-use respective channels corresponding to the same frequency band, one of two alternatives has to be selected. Either (step ET5 : yes) at least one subset and at most M subsets containing T=2 beams can use two respective channels corresponding to the same frequency band have been determined, and the preceding steps for subsets of size T=T+1=3 (step EI8=step EI6) are iterated to determine which of these subsets of size 3 containing beams able to re-use respective channels corresponding to the same frequency band, by iteration for subsets of size T=T+1, with T≤I. Or (step ET5: no) no subset of size T containing beams which can re-use the same frequency band has been determined and in this case (step EF) the conditions for channel re-use are restricted to subsets of size t=(T–1) which can re-use the same channel. This determines subsets which are "optimal" in the sense that they constitute groups of (T–1) beams of maximal size that can re-use respective channels corresponding to the same frequency band. In practise, the intersections between subsets are not necessarily empty, and the same respective channels that can be used in the subsets of size (T–1) are therefore separate.

The FIG. 3 algorithm is a general algorithm relating to implementation of the invention. It is applied in part or in full depending on whether the satellite network uses capacity reallocation or coverage reconfiguration, respectively.

Figure 4:
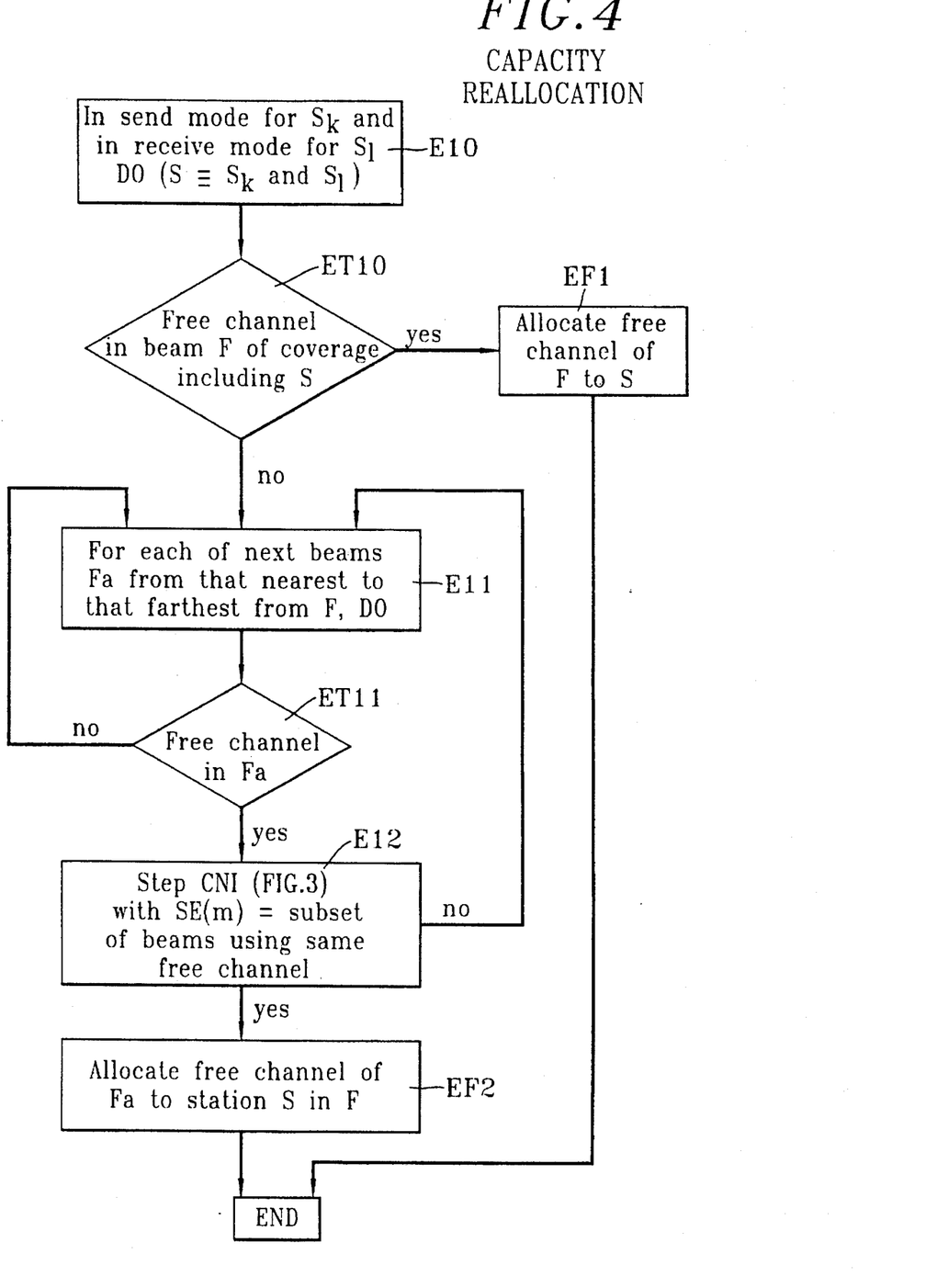
FIG. 4 is an algorithm for allocating a channel in a satellite network with frequency re-use employing reallocating capacity between beams.

The FIG. 4 algorithm concerns a satellite network using capacity reallocation. In a network of this kind the beams are fixed and the coverages of the beams are therefore of constant size. Network management consists in dynamic reallocation of channels between beams, the latter each containing a number of channels which varies with the traffic in the beam coverage in question. The FIG. 4 algorithm is implemented in the control station SC in response to reception of a call setting-up request message from a calling station, denoted $S_k$, wishing to set up a call to a called station denoted $S_l$. For the call to be set up between the station $S_k$ and the station $S_l$, a channel must be allocated to each of the stations in the beam defining the coverage in which the station is located. Accordingly, as indicated in step E10, the FIG. 4 algorithm concerns both the calling station $S_k$ and the called station $S_l$, both denoted S in the remainder of the algorithm.

A first test step ET10 looks for at least one free channel in the beam F defining the coverage in which the station S is located. If there is a free channel then it is allocated to the station S (step EF1). If not, successive beams Fa defining respective coverages from that nearest to that farthest from the coverage of the beam F including the station S are checked to see if there is at least one free channel (steps E11 and ET11). If there is no free channel in any of the successive beams Fa from that nearest to that farthest from the beam F defining the coverage including the station S, the algorithm is iterated for the next beam.

As soon as at least one free channel is found in one of these beams, in accordance with the invention, the step involving calculation CNI of the levels of isolation previously described with reference to FIG. 3 is carried out. This step, denoted E12 in FIG. 4, is applied to a subset SE(m) combining the beams using a channel corresponding to the same frequency band as the free channel found in one of the beams Fa adjacent the beam F defining the coverage including the station S. For the resulting subset SE(m), containing T beams, for example, T levels of isolation N(t) are calculated, with $1 \leq t \leq T$. As shown in block CNI in FIG. 3, each of these T levels of isolation N(t) is equal to the ratio of the antenna gain of the main lobe of the respective one of the beams of the subset taken at the boundary of the coverage of that beam to the sum of the respective maximal antenna gains of the secondary lobes of the other beams in the resulting subset SE(m). If each of these T levels of isolation N(t) is more than the threshold TH, then the free channel found in said one of the adjacent beams is allocated to the beam defining the coverage including the station S (step EF2).

If at least one of these T levels of isolation is less than the threshold TH, the search for a free channel continues by iteration in the subsequent adjacent beams. As soon as a free channel is found, the step E12 for calculating the levels of isolation is carried out, and so on in an iterative manner, as shown by the connection between steps E12 and E11 in FIG. 4, for as long as the levels of isolation calculated for the subset containing the beams using the same frequency band as the free channel found are not all more than said threshold TH.

In the foregoing variant of the invention relating to a satellite network using capacity reallocation, it is assumed that the coverages of the beams are fixed. In a network using coverage reconfiguration the number of channels in each beam is constant but the geometry of the coverages is variable. The use of a method of allocating a channel for the variant of the invention relating to satellite networks of this kind using coverage reconfiguration is described next with reference to FIG. 5.

Figure 5:
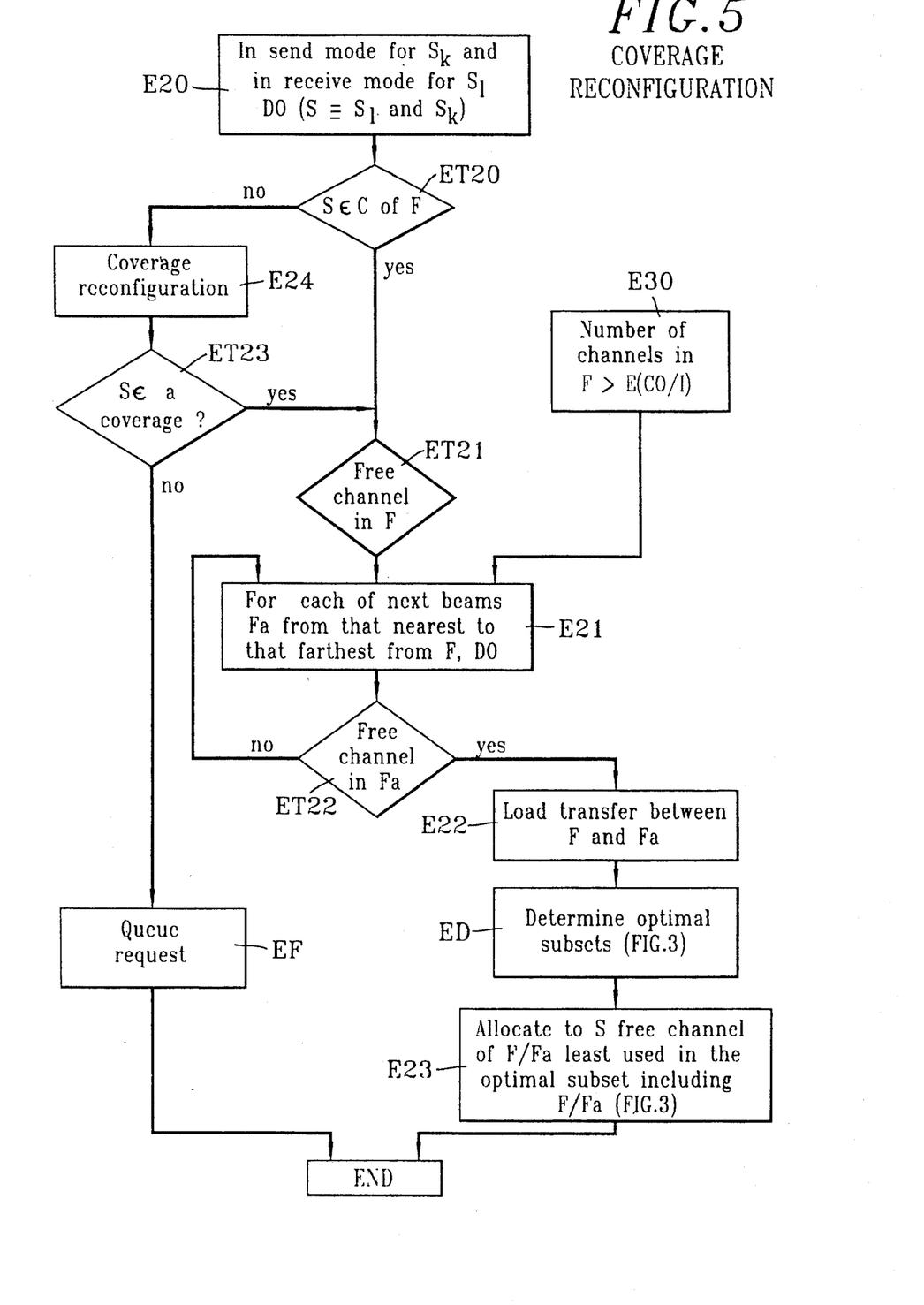
FIG. 5 is an algorithm for allocating a channel in a satellite network with coverage reconfiguration employing frequency re-use.

As previously, for the variant of the invention relating to a satellite network using capacity reallocation, the FIG. 5 algorithm concerns both the calling station $S_k$ and the called station $S_l$ in the network and is implemented in the control station SC. In the remainder of the algorithm from step E20 the calling station $S_k$ and the called station $S_l$ are both denoted S. Step ET20 first determines whether station S belongs or does not belong to a coverage C of a beam F.

If the station S belongs to a beam coverage C, step ET21 then determines if the beam associated with this coverage includes at least one free channel. If there is a free channel, then this free channel is allocated to the station S. If a plurality of free channels are found in the beam whose coverage includes the station S, then to the station S is allocated whichever of those free channels is least used in the optimal subset including the beam whose coverage includes the station S (step E23). Remember that the optimal subsets are determined by the FIG. 3 algorithm.

If the coverage including the station S has no free channel, then the subsequent beam coverages from that nearest to that farthest from the coverage C including the station S are examined to determine which of these coverages is produced by a beam having a free channel (steps E21 and ET22). As soon as one of these coverages adjacent the coverage C including the station S has been identified, a load transfer (step E22) is effected between the beam F associated with the coverage including the station S and the beam Fa including a free channel. As described with reference to FIG. 11 in the previously mentioned U.S. Pat. No. 5,355,138, this transfer consists in reducing the size of the coverage of beam F including the station S and increasing commensurately the size of the coverage associated with the beam Fa including a free channel so that the latter coverage can include the station S. As previously, if only one free channel is found in the adjacent coverage, then this free channel is allocated to the station S. If plural channels are found in the adjacent beam, then to the station S is allocated whichever of these free channels is least used in the optimal subset including the adjacent beam (step E23).

By definition, the optimal subsets depend on the geometry of the beam coverages and therefore on the configuration of the beams. The load transfer described with reference to step E22 modifies the coverage geometry. Consequently, between the load transfer (step E22) and allocation to the station S of the free channel least used in the adjacent beam there is a step for determining optimal subsets ED using the algorithm shown in FIG. 3. The step ED redefines the optimal subsets in dependance on modifications relating to the respective coverages including the station S and associated with an adjacent beam having a free channel, following the load transfer (step E22).

Reverting to the other alternative at step ET20, if the station S is not included in any beam coverage, the invention offers a coverage reconfiguration step, as shown in step E24. As described with reference to FIG. 5 of the previously mentioned U.S. Pat. No. 5,355,138, this reconfiguration consists in selecting on the one hand the coverage nearest the station S and on the other hand the coverage with the lowermost surface on the ground. The control station SC runs a simulation for each of these two coverages to reduce the surface of the coverages other than said each of these two coverages in order to free up through simulation a fraction of the power of the satellite SA, and thereby to increase the size of said each of these two coverages in order to include therein the station S. Whichever of these two coverages that can include the station S has the higher antenna gain is then selected (step ET23). The steps ET21, E21, ET22, E22, ED and E23 previously described are then carried out for the coverage now including the station S.

If neither the nearest coverage nor the lowermost surface coverage can include the station S, then the call setting-up request from the calling station is queued (step EF).

As indicated in step E30, there is also provision for redistributing busy channels in the beams so that each beam contains the same number of busy channels. This redistribution facilitates network management by reducing the number of beams in which all channels are busy. To this end, if the number of busy channels in a given beam is greater than a substantially mean number of busy channels per beam such that:

$$E (CO/I),$$

where E denotes the integer part function, CO the number of busy channels in the network and I the number of radio beams in the network, then steps E21, ET22, E22, ED and E23 are applied to said given beam, so that some stations in the given beam are assigned a channel of a beam adjacent said given beam in order to free up a channel in the given beam.

What we claim is:

1. In a satellite telecommunication network comprising a control station, a satellite for forming beams of radio channels under the control of said control station, and plural earth stations for transmitting beam channels to said satellite and receiving beam channels from said satellite, same channels being re-used in different beams, the method for allocating a free beam channel by said control station to calling and called stations, in response to reception of a call setting-up request message emitted by said calling station via a signalling channel of said satellite in said control station, said method entailing simulation in said control station of one of first and second alternatives separately for each of the calling and called stations, and then a final step, (a) said first alternative whereby at least one free channel belongs to a beam forming a coverage including each of the calling and called stations, comprising the step of allocating said at least one free channel to said each of the calling and called stations;

(b) said second alternative whereby there is no free channel on said beam forming said coverage including said each of the calling and called stations, comprising the following iterative steps:

(b1) searching for free channels in each of adjacent beams from that nearest to that farthest from said beam forming said coverage including said each of the calling and called stations thereby identifying free channels, and (b2) in response to said free channels identified in each of said adjacent beams, allocating in a simulated way one of said free channels identified in each of said adjacent beams to said each of the calling and called stations by transferring load between said coverage including said each of the calling and called stations and an adjacent coverage associated with each of said adjacent beams by reducing in surface said coverage including said each of the calling and called stations and increasing in surface said adjacent coverage so that said each of the calling and called stations is included in said adjacent coverage, and determining optimal subsets of beams each comprising beams able to re-use the same channel, and selecting said one of said free channels identified in each of said adjacent beams as that which is least used in one of said optimal subsets of beams including each of said adjacent beams; and (c) said final step comprising the step of emitting a call setting-up authorization message from said control station to said calling station as soon as said one of said free channels identified is allocated to each of said calling and called stations.

2. A method according to claim 1 wherein said step of determining optimal subsets of beams includes the following iterative steps of:

constituting $$C_I^T = \frac{I!}{T!(I-T)!}$$

separate subsets of T beams from I beams of said network, T being an integer initialized to 2 and being incremented by 1 on each said iterative step up to at most I, and for each of said $C_I^T$ subsets of T beams calculating T levels of isolation each equal to the ratio of an antenna gain of a main lobe of a respective one of said beams in each of said $C_I^T$ subsets of T beams to the sum of the respective maximal antenna gains of secondary lobes of the other beams in each of said $C_I^T$ subsets of T beams, provided that a conditional relationship establishing that T levels of isolation calculated for at least one of said $C_I^T$ subsets of T beams are more than a predetermined threshold is satisfied, said optimal subsets of beams being made up of subsets of beams from $C_I^{T_L-1}=(I!)/[(T_L-1)!(I-T_L+1)!]$ subsets of beams for each of which $[T_L-1]$ levels of isolation calculated are more than said predetermined threshold, $T_L$ denoting an integer value assumed by T for which said conditional relationship is not satisfied.

3. A method according to claim 1 including in the simulation carried out in said control station, a third alternative whereby said each of the calling and called stations is not included in any beam coverage, comprising the steps of:

determining from beam coverages existing in said network a coverage nearest to said each of the calling and called stations and a lowermost surface coverage;

by iteration, for each of the nearest and lowermost surface coverages, reducing in size each of said coverages other than said each of the nearest and lowermost surface coverages whilst maintaining in said coverages stations which are active prior to said reception of the call setting-up request message, until said each of the nearest and lowermost surface coverages can be increased to include said each of the calling and called stations with a respective antenna gain in said each of the nearest and lowermost surface coverages, and selecting one of said nearest and lowermost surface coverages into a selected coverage as a function of the higher of two antenna gains respectively calculated for said nearest and lowermost surface coverages to include said each of the calling and called stations in said selected coverage, said step of selecting being followed by one of said first and second alternatives and said final step.

4. A method according to claim 1 comprising, in response to a number of busy radio channels in one of the beams existing in the network greater than the integer part of a ratio of a number of busy radio channels in said network to the number of beams existing in said network, executing said second alternative for each station covered by said one of the beams, when the number of said busy radio channels in said one of the beams is greater than said integer part, so that to each of said stations belonging to a coverage of said one of the beams is assigned a radio channel of a beam adjacent said one of the beams to free up a radio channel in said one of the beams.

5. In a satellite telecommunication network comprising a control station, a satellite for forming beams of radio channels under the control of said control station, and plural earth stations for transmitting beam channels to said satellite and receiving beam channels from said satellite, same channels being re-used in different beams, the method for allocating a free beam channel by said control station to calling and called stations, in response to reception of a call setting-up request message emitted by said calling station via a signalling channel of said satellite in said control station, said method entailing simulation in said control station of one of first and second alternatives separately for each of the calling and called stations, and then a final step, (a) said first alternative whereby at least one free channel belongs to a beam forming a coverage including each of the calling and called stations, comprising the step of allocating said at least one free channel to said each of the calling and called stations;

(b) said second alternative whereby there is no free channel on said beam forming said coverage including said each of the calling and called stations, comprising the following iterative steps:

(b1) searching for free channels in each of adjacent beams from that nearest to that farthest from said beam forming said coverage including said each of the calling and called stations thereby identifying free channels, and (b2) allocating to said each of the calling and called stations of one of said free channels identified in each of said adjacent beams as soon as in an optimal subset of beams comprising all beams using the same channel as said one of said free channels, each level of isolation equal to the ratio of an antenna gain of a main lobe of a respective beam from said all beams in said optimal subset to the sum of maximal antenna gains of secondary lobes of the other beams in said optimal subset is greater than a given threshold; and (c) said final step comprising the step of emitting a call setting-up authorization message from said control station to said calling station as soon as said one of said free channels identified is allocated to each of said calling and called stations.

* * * * *